(12) United States Patent
Kuo et al.

(10) Patent No.: US 7,466,542 B2
(45) Date of Patent: Dec. 16, 2008

(54) LAPTOP COMPUTER WITH REPLACEABLE CAMERA MODULE

(76) Inventors: Yan-Lin Kuo, 8F, 88, Sec. 1, Hsin Tai Wu Rd., Hsichih, Taipei Hsien 221 (TW); Tsan-Shenh Chen, 8F, 88, Sec. 1, Hsin Tai Wu Rd., Hsichih, Taipei Hsien 221 (TW)

( * ) Notice: Subject to any disclaimer, the term of this patent is extended or adjusted under 35 U.S.C. 154(b) by 47 days.

(21) Appl. No.: 11/762,666

(22) Filed: Jun. 13, 2007

(65) Prior Publication Data

US 2008/0117581 A1    May 22, 2008

(30) Foreign Application Priority Data

Nov. 22, 2006    (TW) .............................. 95143171 A

(51) Int. Cl.
*G06F 1/16* (2006.01)
(52) U.S. Cl. ................ 361/683; 345/520; 382/149; 396/97
(58) Field of Classification Search ................. 345/158, 345/173, 520; 348/207.1, 207.99, 142; 358/1.1, 358/1.13, 442; 382/266, 149; 396/97, 263; 386/117; 361/679–687, 724–727
See application file for complete search history.

(56) References Cited

U.S. PATENT DOCUMENTS

| 6,764,346 B2* | 7/2004 | Fujita et al. ................. 439/638 |
| 2004/0208492 A1* | 10/2004 | Oguro ......................... 386/117 |
| 2005/0146610 A1* | 7/2005 | Creamer et al. .......... 348/207.1 |

* cited by examiner

*Primary Examiner*—Hung V Duong
(74) *Attorney, Agent, or Firm*—Theodore Lapus; Edwin Greiner

(57) ABSTRACT

A laptop computer is disclosed. The laptop computer comprises a processor, a memory, a graphics controller, a display panel and a display housing. The display housing is for holding the display panel. The display housing has an opening for fixing a replaceable camera module or a replaceable cover module selectively. When the replaceable camera module is fixed to the opening, the replaceable camera module is electrically connected with the graphics controller and provides pixel data. The graphics controller then drives the display panel to display the pixel data.

8 Claims, 5 Drawing Sheets

LAPTOP COMPUTER WITH REPLACEABLE CAMERA MODULE

FIELD OF THE INVENTION

The present invention relates to a laptop computer, and more particularly to a laptop computer with a selectively installed camera module or cover module onto a display housing.

BACKGROUND OF THE INVENTION

As videoconferencing becomes more popular, the demand for laptop computers with a camera increases. At present, most built-in cameras are installed at the top of a screen to facilitate users to capture the proceeding of a videoconference. As shown in FIG. 5, a camera 53 is built into the top of a display panel 51 to facilitate users to capture images. Since the external appearance of each laptop computer varies, manufacturers have to prepare several different models of camera modules to fit different types of display housings 52 and constitute an overall appearance.

In addition, if a user buys a laptop computer without a reserved opening on the display housing for the installation of a camera due to their budget or current needs, and the user needs to have the videoconference function later, then the user will have to use an external camera because the laptop computer cannot be upgraded with a built-in camera, thus causing inconvenience to users.

Also, if a user purchases a laptop computer having a built-in camera, the user cannot upgrade the built-in camera to a high-resolution camera. At present, the material control and the expandability of built-in cameras have problems and require improvements in the manufacture of laptop computers.

In view of the shortcomings of the prior art, the inventor of the present invention, based on years of experience in the related industry in conducting extensive research and experiments, finally developed a laptop computer with a replaceable camera module in accordance with the present invention to overcome the aforementioned shortcomings.

SUMMARY OF THE INVENTION

It is a primary objective of the present invention to provide a laptop computer that improves the efficiency of a manufacturer's material control and the expandability of the laptop computer.

To achieve the aforementioned objective, the present invention provides a laptop computer which comprises a processor, a memory, a graphics controller, a display panel and a display housing. The display housing is provided for holding the display panel, and has an opening for selectively installing a replaceable camera module or a replaceable cover module in the opening, such that if the replaceable camera module is installed in the opening, the camera module will be electrically connected to the graphics controller and provide pixel data, and the graphics controller will drive the display panel to display the pixel data. If the replaceable cover module is installed in the opening, the cover module and the display housing will constitute an overall external look.

In summation of the description above, the laptop computer with a replaceable camera module in accordance with the present invention has the following advantages:

(1) Manufacturers can enhance the efficiency of their material control.

(2) Users can have more options for selecting and buying a laptop computer.

(3) The laptop computer provides a flexible expandability for upgrading a built-in camera.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

In the related figures of preferred embodiments of a laptop computer of the present invention, the same referring numerals are used for the same components in accordance with the present invention.

Figure 1:
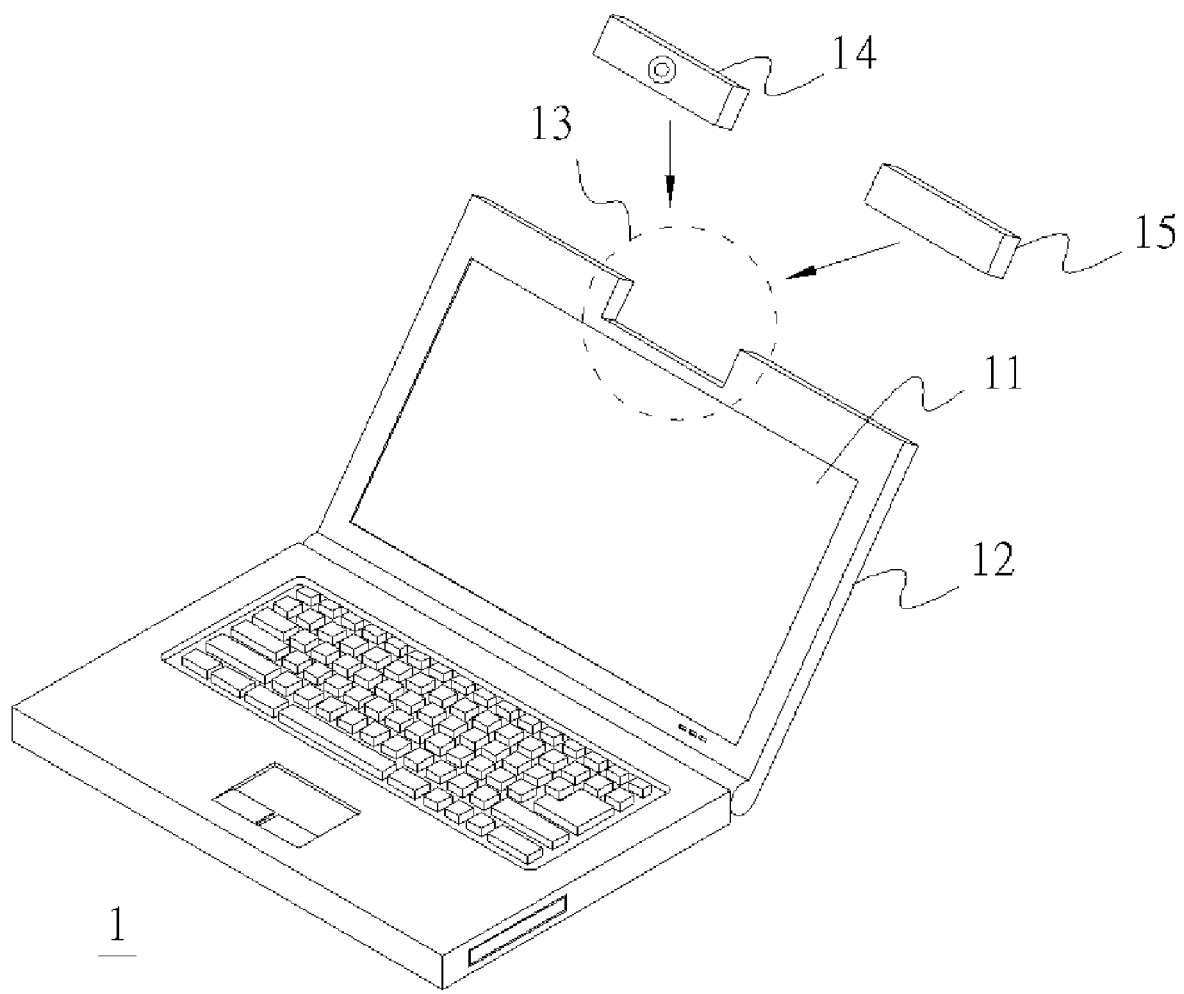
FIG. 1 is a schematic view of a laptop computer of the present invention.
Figure 2:
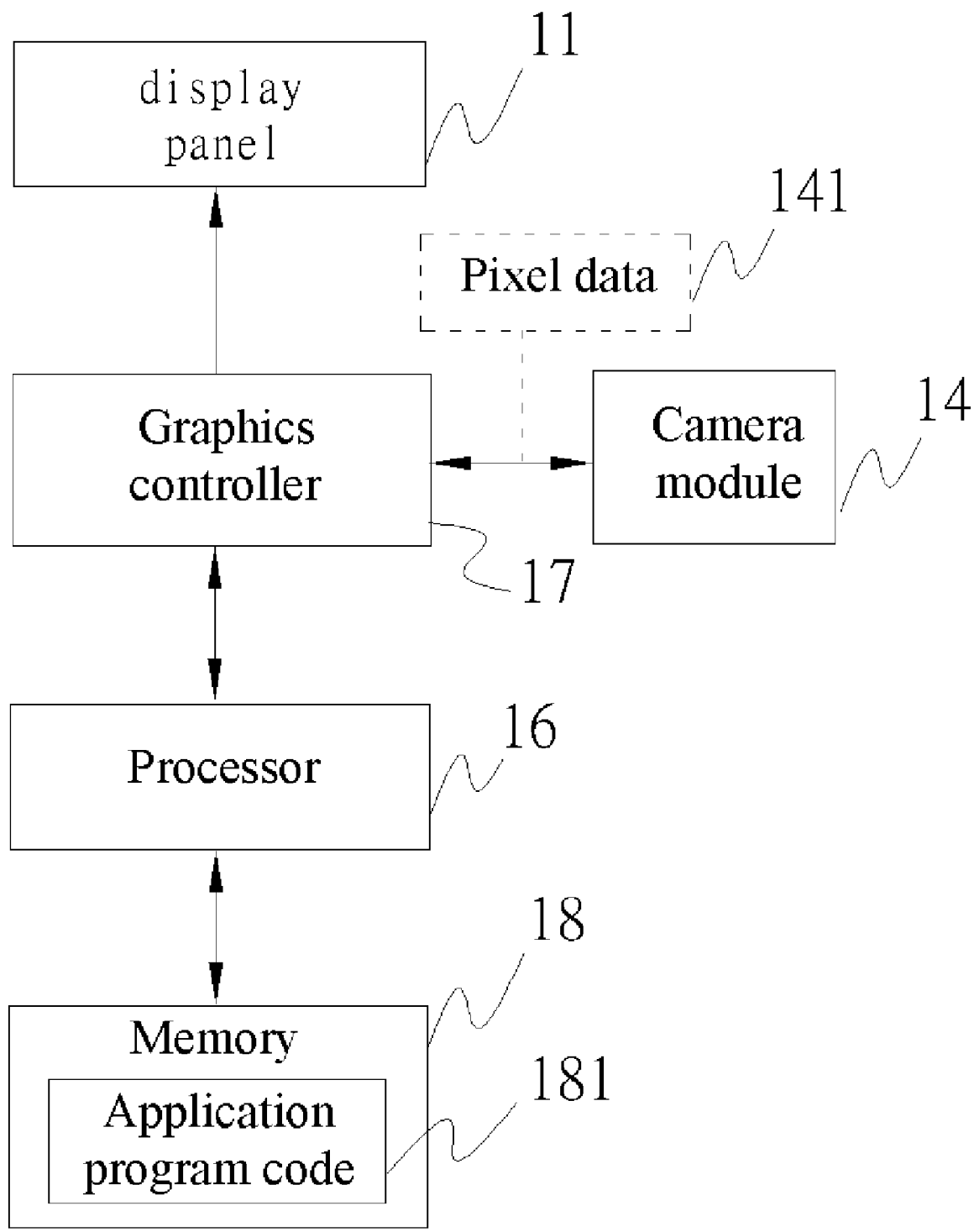
FIG. 2 is a block diagram of a laptop computer installed with a camera module in accordance with the present invention.

Referring to FIGS. 1 and 2 for a schematic view of the present invention and a block diagram of a laptop computer installed with a camera module of the present invention respectively, the laptop computer 1 includes a display housing 12 for holding a display panel 11, and the display housing 12 has an opening 13 for selectively installing a replaceable camera module 14 or a replaceable cover module 15. If the replaceable cover module 15 is installed in the opening 13, the replaceable cover module 15 and the display housing 12 will constitute an overall external look. If the replaceable camera module 14 is installed in the opening 13 as shown in FIG. 2, the camera module 14 will be electrically connected to a graphics controller 17, and provide a pixel data 141 to the graphics controller 17. The graphics controller 17 will drive the display panel 11 to display the pixel data 141. The replaceable camera module 14 or the replaceable cover module 15 is engaged with the display housing 12 by a bolt-and-nut locking method or a mortise-and-tenon fastening method.

Figure 6:
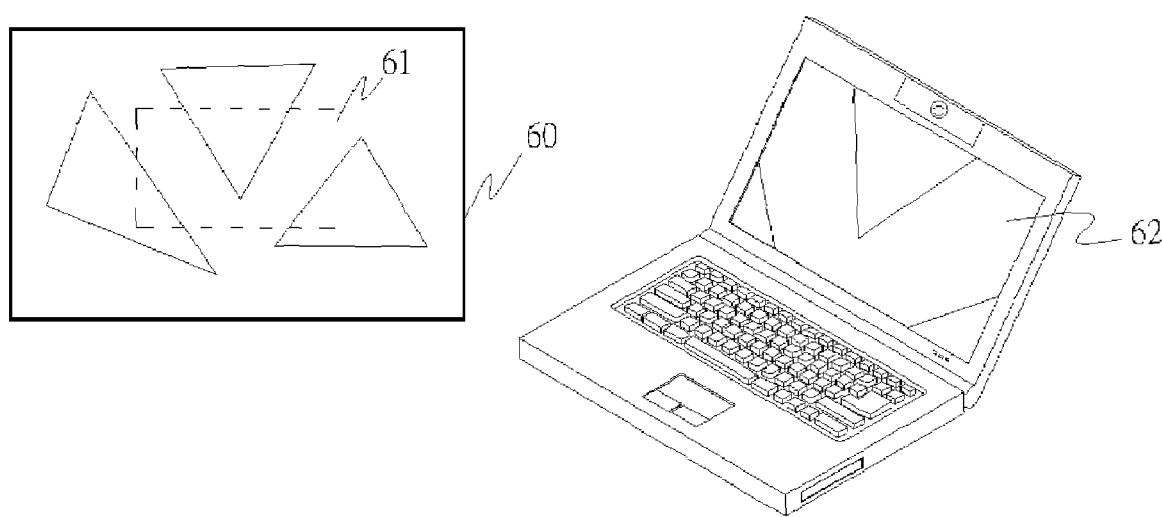
FIG. 6 is a schematic view of digital zooming and panning.

The camera module 14 preferably includes a complementary metal oxide semiconductor (CMOS) sensor array, and the processor 16 executes an application program code 181 stored in a memory 18 to control the conversion of a pixel data 141 from the camera module 14 to the display panel 11 to achieve digital zooming and panning. Since the CMOS sensor array 60 can output a portion of pixel data by external control, the CMOS sensor array 60, with a 640×480 resolution, can output a pixel data in a region 61, with a resolution of 320×240, to a graphics controller 17, and therefore the display panel 62 can display the image of that region only (as shown in FIG. 6). As a result, digital zooming and panning can be achieved by controlling the position and size of the region 61.

Figure 3A:
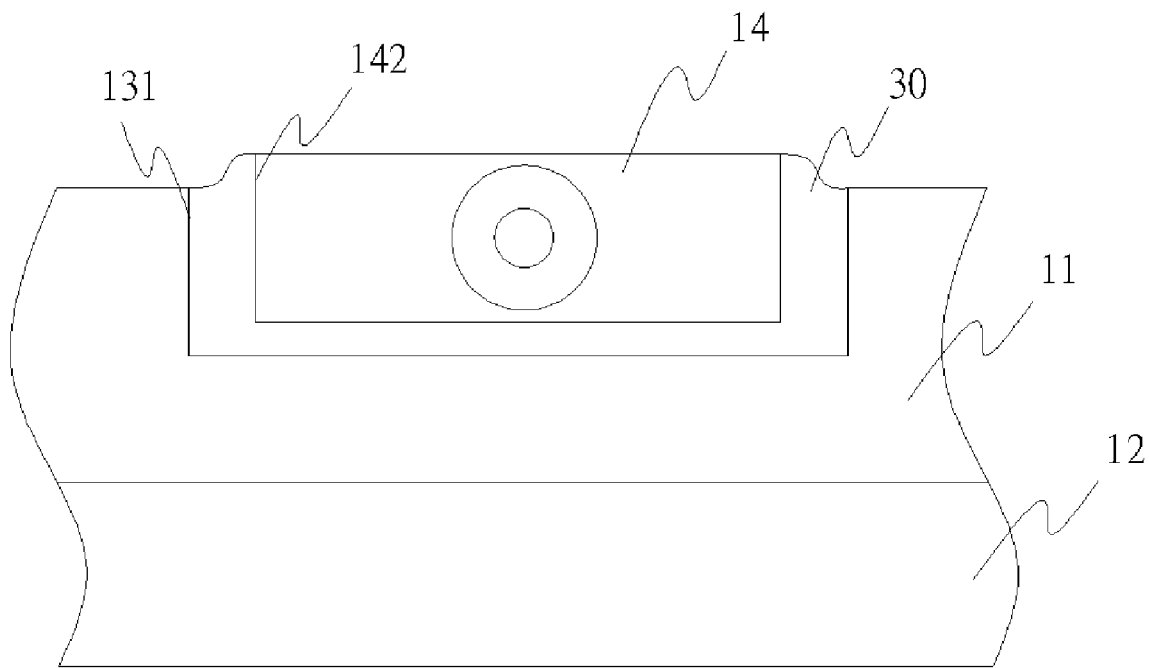
FIG. 3A is a front view of a display housing having a tapered housing in accordance with the present invention.
Figure 3B:
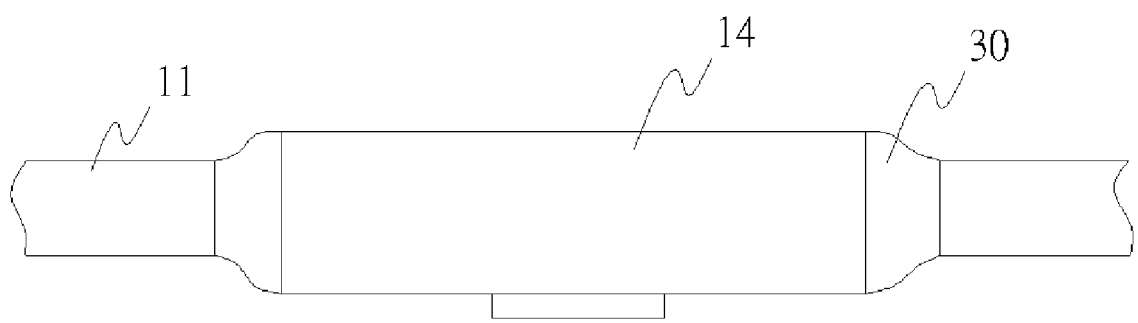
FIG. 3B is a top view of a display housing having a tapered housing in accordance with the present invention.

In addition, the laptop computer 1 can include a tapered housing 30, if needed, as shown in FIGS. 3A and 3B. FIGS. 3A and 3B show a front view and a top view of a display housing 12 of the invention respectively, and a tapered housing 30 is connected to an edge 142 of the camera module 14 and an edge 131 of the opening 13, and the tapered housing 30 is tapered from the edge 142 of the camera module 14 to the edge 131 of the opening 13, such that the display housing 12, the tapered housing 30 and the camera module 14 will constitute an overall external look.

Figure 4:
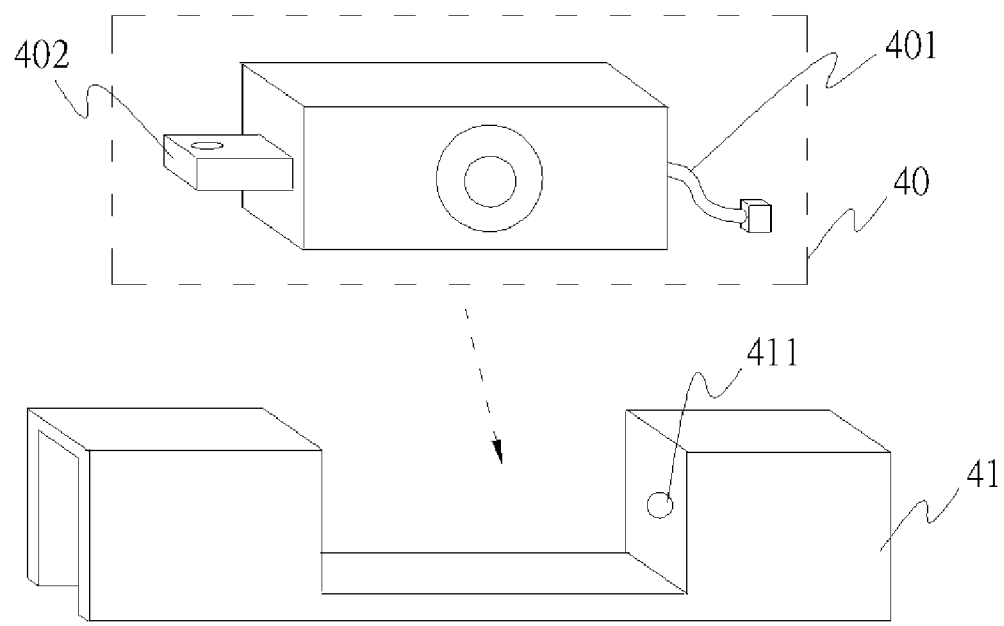
FIG. 4 is a top view of a rotatable camera module of the present invention.
Figure 5:
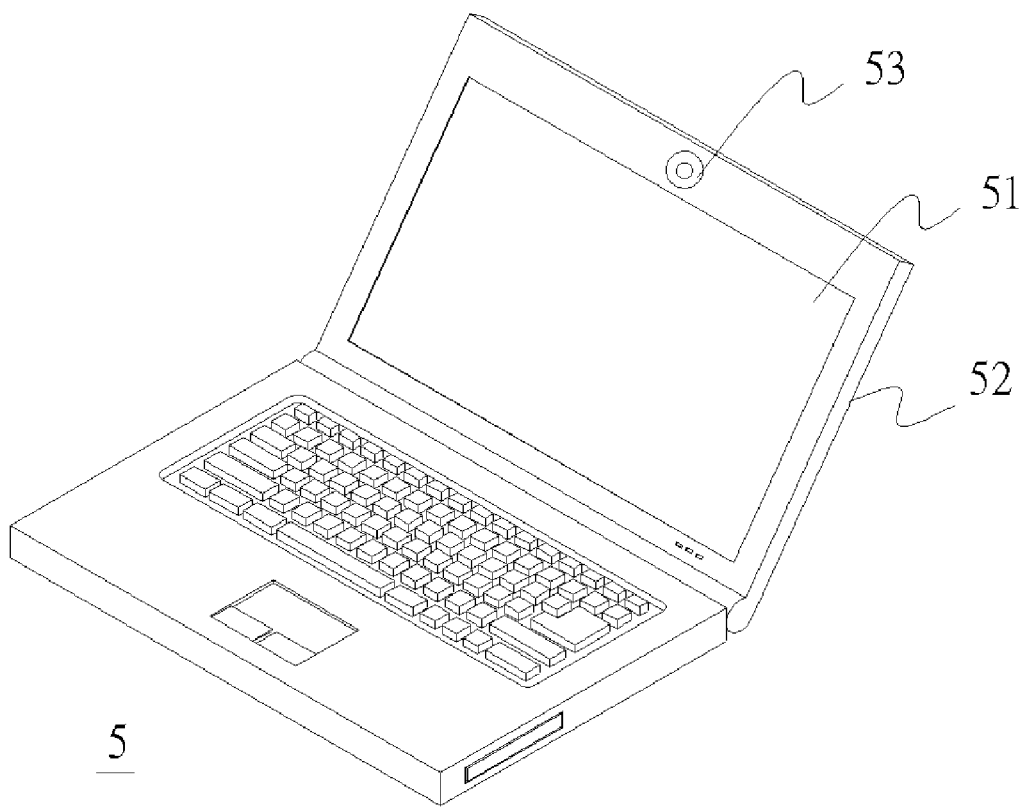
FIG. 5 is a schematic view of a built-in camera of a laptop computer in accordance with a prior art.

Further, the replaceable camera module preferably includes a fixed camera, or a rotatable camera and a camera chassis module as shown in FIG. 4, and the rotatable camera 40 is installed on the camera chassis module 41 which provides the support for the rotatable camera 40 during its rotation, so as to extend the lifetime of the rotatable camera 40. During assembly, a connecting wire 401 of the rotatable camera 40 is passed through an opening 411 and electrically connected to the graphics controller 17, and a bearing 402 is engaged with a rotating structure (not shown in the figure) of the camera chassis module 41, so that the rotatable camera 40 can be rotated on the camera chassis module 41 after the assembling.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A laptop computer, comprising:
   a processor;
   a memory, electrically connected to said processor;
   a graphics controller, electrically connected to said processor;
   a display panel, electrically connected to said graphics controller; and
   a display housing, for holding said display panel, and said display housing having an opening for selectively installing a replaceable camera module or a replaceable cover module;
   thereby, if said replaceable camera module is installed to said opening, said replaceable camera module will be electrically connected to said graphics controller for providing a pixel data, and said graphics controller will drive said display panel to display said pixel data.

2. The laptop computer of claim 1, further comprising a tapered housing coupled to an edge of said camera module and an edge of said opening, and the shape of said tapered housing is tapered between the edge of said camera module and the edge of said opening.

3. The laptop computer of claim 2, wherein said replaceable cover module and said display housing are integrated to constitute an overall external look, when said replaceable cover module is installed into said opening.

4. The laptop computer of claim 1, wherein said replaceable camera module includes a rotatable camera and a camera chassis module.

5. The laptop computer of claim 1, wherein said replaceable camera module includes a fixed camera.

6. The laptop computer of claim 5, wherein said fixed camera comes with a fixed focus length and an imaging array.

7. The laptop computer of claim 6, wherein said imaging array is a complementary metal oxide semiconductor (CMOS) sensor array.

8. The laptop computer of claim 7, wherein said processor executes an application program code stored in said memory to control the conversion of said pixel data from said camera to said display panel, so as to achieve digital zooming and panning.

* * * * *